(12) United States Patent
Watanabe et al.

(10) Patent No.: US 11,639,203 B2
(45) Date of Patent: May 2, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 338 days.

(21) Appl. No.: 16/947,997

(22) Filed: Aug. 27, 2020

(65) Prior Publication Data

US 2021/0094630 A1    Apr. 1, 2021

(30) Foreign Application Priority Data

Sep. 30, 2019   (JP) .............................. JP2019-178532

(51) Int. Cl.
*B62D 35/00*     (2006.01)
*F15D 1/00*      (2006.01)

(52) U.S. Cl.
CPC ............. *B62D 35/00* (2013.01); *F15D 1/008* (2013.01); *F15D 1/0075* (2013.01)

(58) Field of Classification Search
CPC ...... B62D 35/00; B62D 35/008; B62D 37/02; F15D 1/0075; F15D 1/008; Y02T 10/82
See application file for complete search history.

(56) References Cited

U.S. PATENT DOCUMENTS

| | | | | | |
|---|---|---|---|---|---|
| 3,578,264 | A | * | 5/1971 | Kuethe ..................... | F28F 1/32 181/220 |
| 4,180,290 | A | * | 12/1979 | Drews .................... | B62D 35/00 244/130 |
| 4,284,302 | A | * | 8/1981 | Drews .................... | B62D 35/00 296/180.1 |
| 6,412,853 | B1 | * | 7/2002 | Richardson ............ | B62D 35/00 296/180.1 |
| 7,703,479 | B2 | * | 4/2010 | Jacob .................... | B64C 23/005 244/130 |
| 8,016,247 | B2 | * | 9/2011 | Schwimley ........... | B64C 23/005 244/200 |
| 8,315,847 | B1 | * | 11/2012 | Schmidt .................... | F15D 1/12 244/130 |
| 10,495,121 | B2 | * | 12/2019 | Smullin ................ | B64C 23/005 |

(Continued)

FOREIGN PATENT DOCUMENTS

| | | | | | |
|---|---|---|---|---|---|
| CN | 106573652 B | * | 8/2019 | ............. | B62D 25/10 |
| DE | 102016001111 A1 | * | 8/2017 | ............. | B62D 25/10 |

(Continued)

*Primary Examiner* — Lori L Lyjak
(74) *Attorney, Agent, or Firm* — Troutman Pepper Hamilton Sanders LLP (57) ABSTRACT

An airflow adjusting apparatus to be installed in a vehicle includes two or more outward airflow generators and a controller. The outward airflow generators are disposed side by side in a vehicle front-rear direction in vicinity of an outer edge in a vehicle widthwise direction on an upper surface of a vehicle body on a front side of a windshield. The outward airflow generators are each configured to form an outward airflow with respect to the vehicle body. The outward airflow flows in a direction that is toward an outer side in the vehicle widthwise direction and toward a rear side of the vehicle. The controller is configured to control the outward airflow generators.

17 Claims, 8 Drawing Sheets

(56) References Cited

U.S. PATENT DOCUMENTS

| | | | |
|---|---|---|---|
| 2005/0040669 A1* | 2/2005 | Wood | B62D 35/001 |
| | | | 296/180.1 |
| 2008/0122252 A1* | 5/2008 | Corke | B62D 35/001 |
| | | | 296/180.1 |
| 2010/0072777 A1* | 3/2010 | Ramsay | B62D 35/00 |
| | | | 296/180.1 |
| 2014/0084631 A1 | 3/2014 | Kojima | |
| 2015/0251711 A1* | 9/2015 | Carlson | B62D 35/00 |
| | | | 296/180.1 |
| 2019/0176908 A1* | 6/2019 | Slight | B62D 35/00 |
| 2019/0193843 A1* | 6/2019 | Kikuchi | B64C 23/005 |

FOREIGN PATENT DOCUMENTS

| | | | | |
|---|---|---|---|---|
| JP | 2011-255758 A | 12/2011 | | |
| JP | 2014-69611 A | 4/2014 | | |
| JP | 6435434 B1 * | 12/2018 | | B62D 35/00 |

\* cited by examiner

AIRFLOW ADJUSTING APPARATUS

CROSS REFERENCE TO RELATED APPLICATIONS

The present application claims priority from Japanese Patent Application No. 2019-178532 filed on Sep. 30, 2019, the entire contents of which are hereby incorporated by reference.

BACKGROUND

The technology relates to a vehicle airflow adjusting apparatus that adjusts an airflow generated around a vehicle body of a traveling vehicle.

Traveling wind may be generated against a vehicle such as an automobile while the vehicle is traveling. Such traveling wind can interfere with a windshield and flow toward a lateral side to cause turbulence including a longitudinal vortex, etc. around front pillars (sometimes referred to as "A-pillars") that support lateral-side ends of the windshield. The turbulence can be a cause of aerodynamic noise (so-called wind noise) and aerodynamic vibration, affecting quietness and comfortableness of the vehicle. In addition, the turbulence can increase air resistance against the vehicle, affecting driving stability such as straight line vehicle stability. Japanese Unexamined Patent Application Publication No. 2011-255758 discloses to mount an outer molding on a surface of a front pillar. The outer molding has a molding part that covers a lateral-side end of a windshield. Japanese Unexamined Patent Application Publication No. 2014-069611 discloses to provide a passage between a front pillar and a pillar outer cover attached to outside of the front pillar. The passage allows air to flow therethrough.

SUMMARY

An aspect of the technology provides an airflow adjusting apparatus to be installed in a vehicle. The apparatus includes two or more outward airflow generators and a controller. The outward airflow generators are disposed side by side in a vehicle front-rear direction in vicinity of an outer edge in a vehicle widthwise direction on an upper surface of a vehicle body on a front side of a windshield. The outward airflow generators are each configured to form an outward airflow with respect to the vehicle body. The outward airflow flows in a direction that is toward an outer side in the vehicle widthwise direction and toward a rear side of the vehicle. The controller is configured to control the outward airflow generators.

An aspect of the technology provides an airflow adjusting apparatus to be installed in a vehicle. The apparatus includes two or more inward airflow generators and a controller. The inward airflow generators are disposed side by side in a vehicle front-rear direction on an upper surface of a vehicle body on a front side of a windshield. The inward airflow generators are each configured to form an inward airflow with respect to the vehicle body. The inward airflow flows in a direction that is toward an inner side in a vehicle widthwise direction of the vehicle and toward a rear side of the vehicle. The controller is configured to control the inward airflow generators.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

First Example Embodiment

Figure 1:
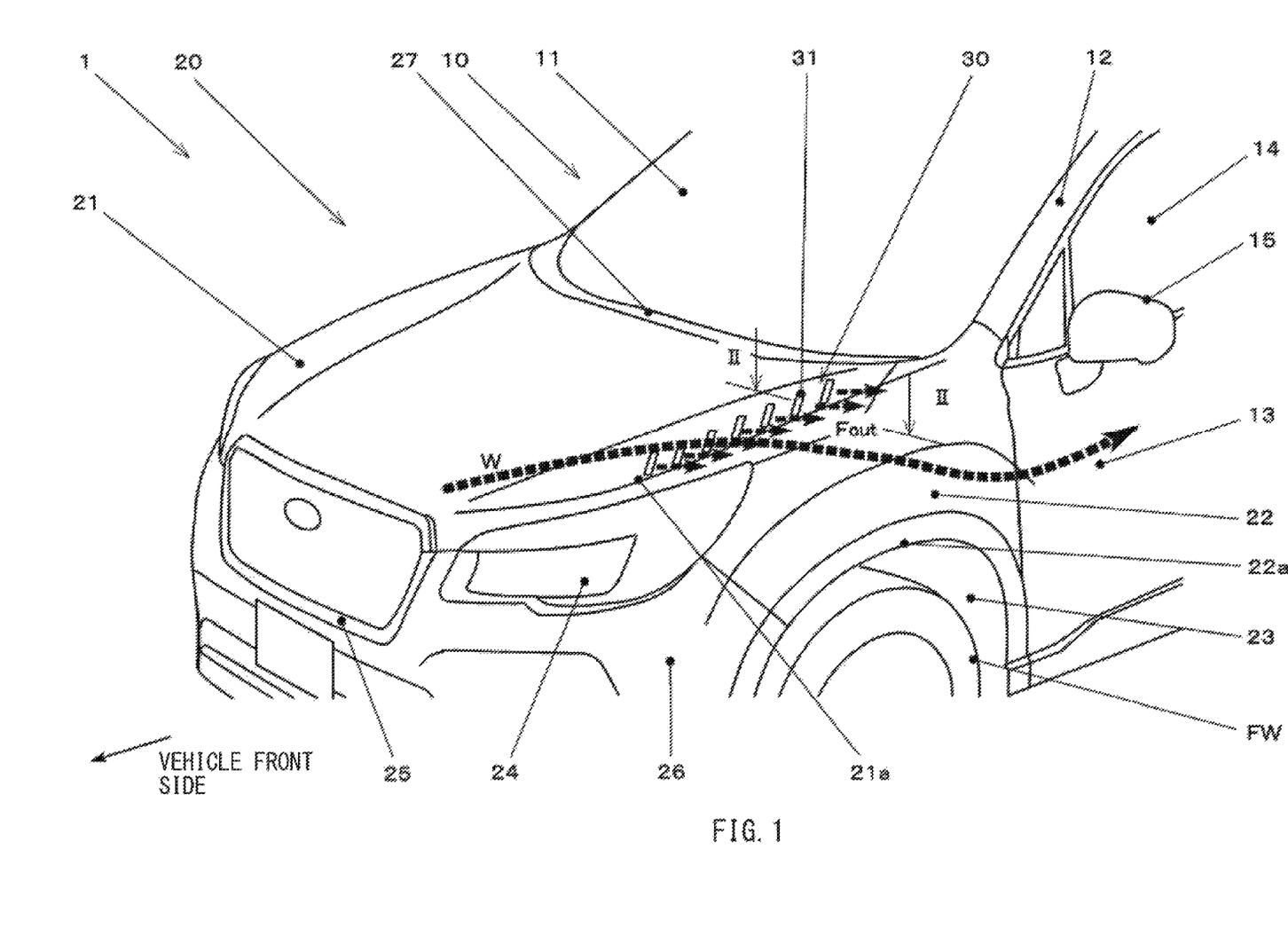
FIG. 1 is an external perspective view of an example of a front portion of a vehicle provided with an airflow adjusting apparatus according to one example embodiment of the technology.

FIG. 1 is an external perspective view of a front portion of a vehicle provided with an airflow adjusting apparatus according to a first example embodiment of the technology. The airflow adjusting apparatus according to the first example embodiment may be provided in a vehicle such as a passenger car, for example. The airflow adjusting apparatus may adjust an airflow that is generated around a vehicle body of the traveling vehicle and relative to the vehicle. In the first example embodiment, the airflow adjusting apparatus may use a plasma actuator 100, which will be described later, to generate an induced airflow, thereby adjusting the airflow around the vehicle body. The induced airflow may be sometimes referred to as ion wind.

A vehicle 1 may be, for example but not limited to, a two-box passenger car including a cabin 10 and an engine compartment 20. In the first example embodiment, a body part of the vehicle body may include the cabin 10 and the engine compartment 20. The cabin 10 may have a space that accommodates an occupant. The cabin 10 may include, for example but not limited to, a windshield 11, A-pillars 12, front doors 13, front door glasses 14, and door mirrors 15.

The windshield 11, which is sometimes referred to as a "front window", may be provided on an upper half of a front portion of the cabin 10. The windshield 11 may be so tilted rearward with respect to a vertical direction that an upper end of the windshield 11 is positioned on a vehicle rear side with respect to a lower end of the windshield 11. The windshield 11 may be so curved that a middle portion of the windshield 11 in a vehicle widthwise direction protrudes toward a vehicle front side.

The A-pillars 12, which are sometimes referred to as "front pillars", may each be a pillar part that is disposed along corresponding one of left and right ends of the windshield 11.

The front doors 13 may each be a door-shaped part that seals the space in the cabin 10 from its lateral side. The front doors 13 may each be provided on a lateral side of a front portion of the cabin 10. The front doors 13 may each include a hinge at its front end, and may be attached to the body part of the vehicle body by means of the hinge. The front doors 13 may each be thereby allowed to swing around the hinge to open or close the cabin 10 when an occupant gets in or gets out of the vehicle 1.

The front door glasses 14 may each be a glass member that is provided in an upper portion of corresponding one of the front doors 13. The front door glasses 14 may each move upward and downward. When the front door glass 14 is closed, i.e., when the front door glass 14 has moved to an uppermost position, a front end of the front door glass 14 may be disposed along a rear portion of corresponding one of the A-pillars 12.

The door mirrors 15 may each be a side-view mirror that protrudes from an upper portion in the vicinity of a front end of corresponding one of the front doors 13 toward an outer side in the vehicle widthwise direction.

The engine compartment 20 may be disposed, in the body part of the vehicle body, on the vehicle front side with respect to the lower end of the windshield 11. The engine compartment 20 may contain, for example but not limited to, an unillustrated engine which is a traveling power source of the vehicle. The engine compartment 20 may protrude from a lower half of the front end of the cabin 10 toward the vehicle front side. The lower half of the front end of the cabin 10 may be, in other words, a region that is positioned below the lower end of the windshield 11 and corresponds to a bulkhead.

The engine compartment 20 may include, for example but not limited to, a bonnet 21, which may be sometimes referred to as an "engine hood" or an "engine lid", front fenders 22, wheel houses 23, front combination lamps 24, a front grille 25, a front bumper 26, and a cowl 27.

The bonnet 21 may be provided in an upper portion of the engine compartment 20 in an openable and closable manner.

The bonnet 21 may be a door-shaped part that seals a portion containing the engine from upper side. The bonnet 21 may so have a curved surface that a middle portion of the bonnet 21 in a vehicle front-rear direction protrudes upward. The curved surface may have a curvature that is greater in the vicinity of the front end of the bonnet 21. The bonnet 21 may have ends in the vehicle widthwise direction that are each bent downward in a region outside corresponding one of ridge lines 21a to be coupled to a surface portion of corresponding one of the front fenders 22. The ridge lines 21a may each be a portion at which the protruding curved surface, which varies in the vehicle widthwise direction, has a locally-greater curvature. The ridge lines 21a may each extend in the vehicle front-rear direction along corresponding one of lateral-side ends of the bonnet 21. According to the first example embodiment, the ridge lines 21a of the upper surface of the vehicle body on the front side of the front window (i.e., the windshield 11) may be provided on the bonnet 21. Such ridge lines 21a may define outer edges of the upper surface of the vehicle body in the vehicle widthwise direction. In one non-limiting example, the ridge lines 21a may be provided on the outer side in the vehicle widthwise direction with respect to the bonnet 21. In this case, the upper surface of the vehicle body may cover a region outside the bonnet 21. The outer edges of the upper surface of the vehicle body may be defined not only by the ridge lines 21a but also by the outer edges in the vehicle widthwise direction depending on the shape of the bonnet 21.

The front fenders 22 may each be an exterior member included in a lateral-side surface portion of the engine compartment 20. The front fenders 22 may each have a rear edge 22b that extends along a front edge of corresponding one of the front doors 13. Provided below the respective front fenders 22 may be arc-shaped wheel arches 22 a. The wheel arches 22 a may each serve as an upper edge of corresponding one of the wheel houses 23 in a side-view of the vehicle 1.

The wheel houses 23 may each contain corresponding one of front wheels FW of the vehicle 1. The wheel houses 23 may each be provided on inner side of corresponding one of the wheel arches 22a, at a lower-lateral-side portion of the engine compartment 20. The wheel houses 23 may each be a space that is open outward in the vehicle widthwise direction.

The front combination lamps 24 may each include a head lamp and other lamps contained in a single housing to be unitized. The headlamp may have a lighting direction that is set to the vehicle front side. The other lamps may include, for example but not limited to, a turn signal lamp, a position lamp, and a daytime running lamp. The front combination lamps 24 may be provided in a pair. The two front combination lamps 24 may each be provided below the vicinity of corresponding one of left-front end and right-front end of the bonnet 21, and may be separated away from each other in the vehicle widthwise direction.

The front grille 25 may be an exterior member that is provided at an opening through which air is introduced into a component such as an unillustrated radiator core or a condenser of an air conditioner. The front grille 25 may be disposed between the right and the left front combination lamps 24.

The front bumper 26 may be an exterior member included in the front end of the vehicle body, and may be provided below the front combination lamps 24 and the front grille 25. The front bumper 26 may have right and left lateral-side ends that each extend below a front portion of corresponding one of the front fenders 22 and come into contact with a front portion of corresponding one of the wheel houses 23.

The cowl 27 may be a region provided with an unillustrated front wiper device and an airbag device adapted to protect a pedestrian. The front wiper device may wipe the windshield 11. The cowl 27 may be disposed between a rear edge of the bonnet 21 and the lower end or the front end of the windshield 11. The cowl 27 may have a tray-like shape having a depression downward with respect to the surface of the bonnet 21.

The bonnet 21 may be provided with an airflow generating apparatus 30 described below. FIG. 1, etc. illustrate only the airflow generating apparatus 30 provided on the left side in a traveling direction of the vehicle 1. However, the airflow generating apparatus 30 may also be provided on the right side in the traveling direction of the vehicle 1. The airflow generating apparatuses 30 are thus provided symmetrically.

Figure 2:
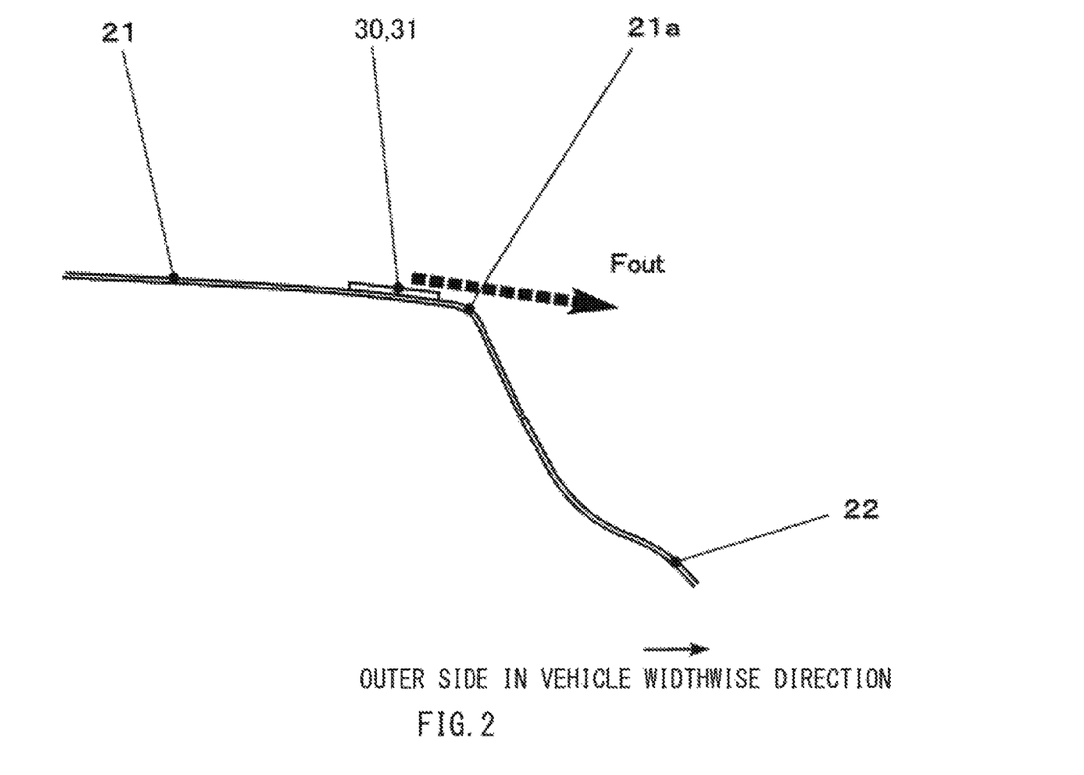
FIG. 2 is a schematic cross-sectional view taken in a direction of arrows II-II illustrated in FIG. 1.

FIG. 2 is a schematic cross-sectional view taken in a direction of arrows II-II illustrated in FIG. 1.

The airflow generating apparatus 30 may generate an airflow that flows along the upper surface of the vehicle body on the front side of the windshield 11. According to the first example embodiment, a plasma actuator 100, which will be described later, may generate the airflow.

The airflow generating apparatus 30 may include two or more outward airflow generators 31. The airflow generating apparatus 30 may cause each of the outward airflow generators 31 to form an outward airflow Fout. According to the first example embodiment, the outward airflow generators 31 may be arranged in a single row in the vehicle front-rear direction along corresponding one of the ridge lines 21a on the upper surface of the vehicle body on the front side of the windshield 11, i.e., in a region provided on the bonnet 21 on an inner side of the ridge lines 21a in the vehicle widthwise direction. In one embodiment, the outward airflow generator 31 may serve as an "outward airflow generator".

The outward airflow generators 31 may each generate the outward airflow Fout with respect to the vehicle body in a direction that is toward the outer side in the vehicle widthwise direction and toward the vehicle rear side. The outward airflow Fout may so flow as to tilt in the vehicle front-rear direction. As illustrated in FIG. 2, the outward airflow generators 31 may be so disposed in a tilted state that a mainstream part of the outward airflow Fout having the maximum flow velocity flows downward with respect to a horizontal direction.

Next, a configuration of a two-electrode plasma actuator 100 to be used in the airflow generating apparatus 30 according to the first example embodiment is described below.

Figure 3:
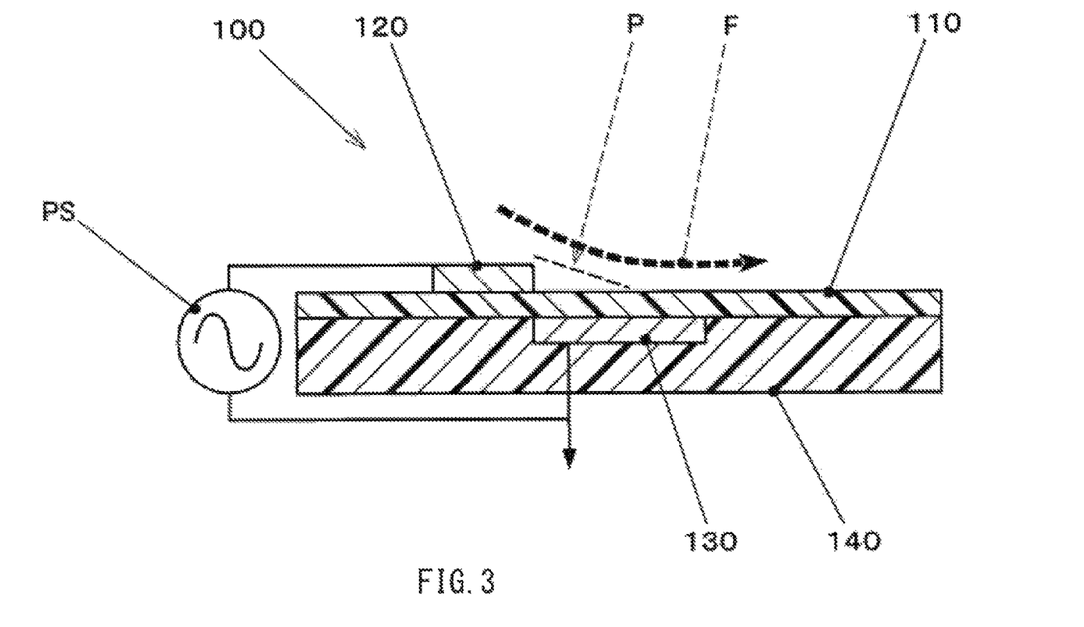
FIG. 3 is a schematic cross-sectional view of an example of a two-electrode plasma actuator to be included in the airflow adjusting apparatus according to one example embodiment.

FIG. 3 is a schematic cross-sectional view of the two-electrode plasma actuator 100.

The two-electrode plasma actuator 100 may be used as each of the outward airflow generators 31 of the airflow generating apparatus 30. The two-electrode plasma actuator 100 may include, for example but not limited to, a dielectric 110, an upper electrode 120, a lower electrode 130, and an insulator 140. In one embodiment, the dielectric 110 may serve as a "dielectric". In one embodiment, the upper electrode 120 and the lower electrode 130 may serve as "electrodes". In one embodiment, a power supply PS, which will be described later, may serve as a "power supply".

The dielectric 110 may be a sheet-shaped member including a material such as fluorocarbon resin, for example. Non-limiting examples of the fluorocarbon resin may include polytetrafluoroethylene.

The upper electrode 120 and the lower electrode 130 may each include a thin-film-shaped electrically-conductive member including a material such as metal, for example. Non-limiting examples of the metal may include copper. The upper electrode 120 may be provided on an outer surface side of the dielectric 110. The outer surface side of the dielectric 110 refers to a side that is exposed to the outside when the plasma actuator 100 is attached to the vehicle body. The lower electrode 130 may be provided on an inner surface side of the dielectric 110 that is opposite to the outer surface side of the dielectric 110. The lower electrode 130 may be so disposed as to be offset with respect to the upper electrode 120 in a surface direction of the dielectric 110.

The insulator 140 may be a sheet-shaped member serving as a base of the plasma actuator 100. The insulator 140 may be so disposed on the inner surface side of the dielectric 110 as to cover an inner surface of the dielectric 110 and the lower electrode 130.

Application, by means of the power supply PS, of an alternating-current voltage having a predetermined waveform between the upper electrode 120 and the lower electrode 130 of the plasma actuator 100 may allow plasma P to be generated between the upper electrode 120 and the lower electrode 130. It may be necessary that the applied voltage be high enough to cause electrical breakdown to generate the plasma P. An allowable applied voltage range may be from 1 kV to 10 kV, for example. Further, a frequency range of the applied voltage may be from 1 kHz to 10 kHz, for example. The plasma P may allow air on the outer surface side of the plasma actuator 100 to be drawn in to induce a wall-jet airflow F.

FIG. 3 illustrates a case where the plasma P induces the airflow F that flows in a direction from the upper electrode 120 toward the lower electrode 130. However, the plasma actuator 100 may control the waveform of the applied alternating-current voltage to thereby reverse the direction of inducing the airflow F.

The airflow adjusting apparatus according to the first example embodiment may include a control system described below in order to supply driving electric power to the two-electrode plasma actuator 100 to generate the outward airflow Fout, and to thereby adjust an airflow in the vicinity of a lateral-side portion of the vehicle body. In one non-limiting example, the airflow generating apparatus 30 may adjust a turbulent flow accompanied by a vortex flow.

Figure 4:
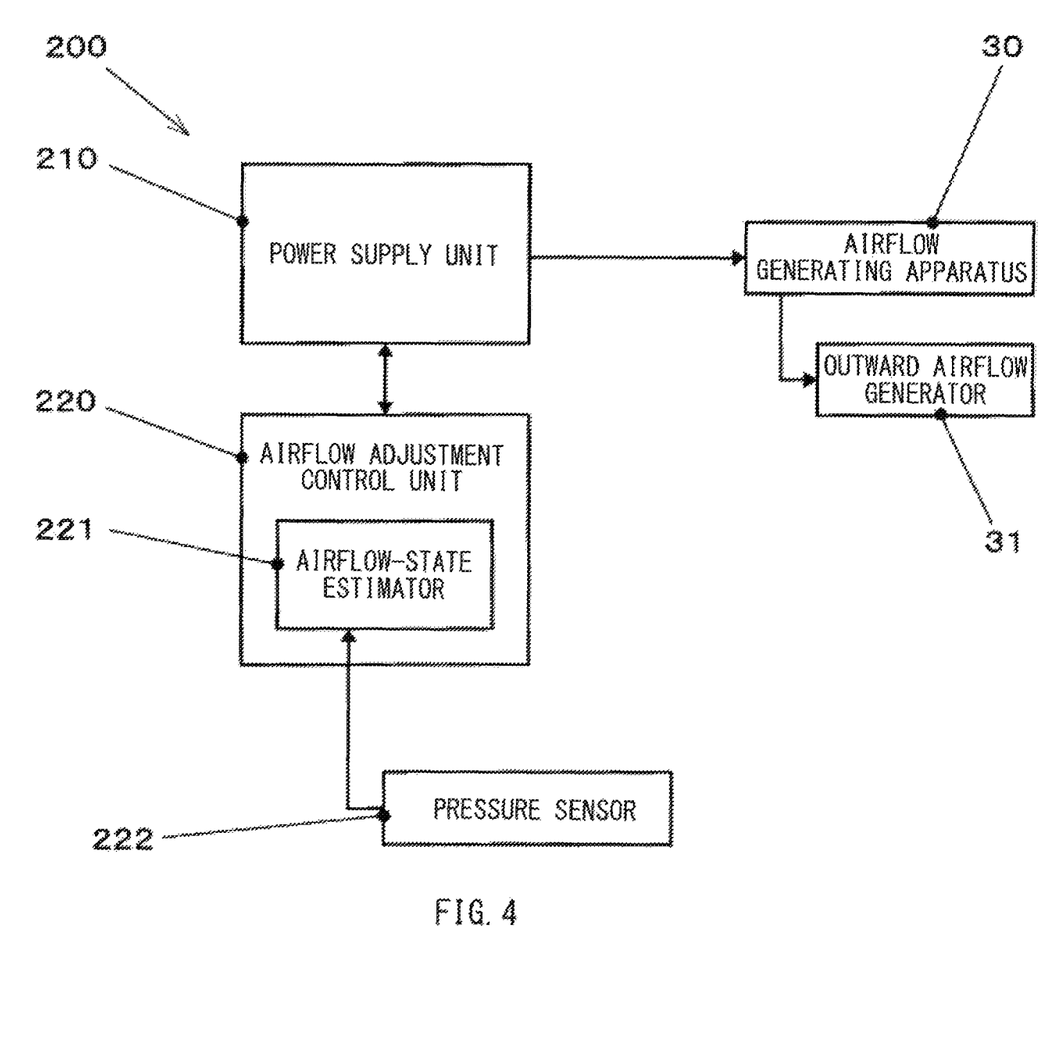
FIG. 4 is a block diagram illustrating an example of a configuration of a control system of the plasma actuator of the airflow adjusting apparatus according to one example embodiment.

FIG. 4 is a block diagram illustrating a configuration of a control system 200 of the plasma actuator 100 in the airflow adjusting apparatus according to the first example embodiment of the technology. In one embodiment, the control system 200 may serve as a "controller".

The control system 200 may include a power supply unit 210 and an airflow adjustment control unit 220.

The power supply unit 210 may include the unitized power supplies PS that perform supply of electric power between the upper electrodes 120 and the lower electrodes 130 of the outward airflow generators 31 (the plasma actuators 100, according to the first example embodiment) independently of each other. The outward airflow generators 31 may be included in the airflow generating apparatus 30.

The airflow adjustment control unit 220 may give the power supply unit 210 an instruction based on a state of the airflow around the vehicle body to thereby control activating and deactivating of the respective outward airflow generators 31. In a case of activating the outward airflow generator 31, the airflow adjustment control unit 220 may control intensity and the flow direction of the outward airflow Fout.

The power supply unit 210 and the airflow adjustment control unit 220 may each include, for example but not limited to: an information processor such as a central processing unit (CPU); a storage device including, without limitation, a random-access memory (RAM) and a read-only memory (ROM); and an input-output interface. Such components may be coupled to each other via a component such as a bus, which may allow such components to communicate with each other.

According to the first example embodiment, the airflow adjustment control unit 220 may include an airflow-state estimator 221.

The airflow-state estimator 221 may be an airflow-state detector configured to estimate a state of crosswind that acts on the vehicle 1. In one embodiment, the airflow-state estimator 221 may serve as an "airflow-state detector". Coupled to the airflow-state estimator 221 may be a pressure sensor 222. The pressure sensor 222 may be disposed on a lateral-side portion on each of the left and the right sides of the vehicle body. The pressure sensor 222 may detect a pressure (i.e., a dynamic pressure) from the lateral side to the surface of the vehicle body. The airflow-state estimator 221 may estimate a direction and intensity of the crosswind on the basis of a difference between the pressure detected by the pressure sensor 222 on the left lateral-side portion and the pressure detected by the pressure sensor 222 on the right lateral-side portion.

In a case where crosswind having predetermined intensity or more is detected, the airflow adjustment control unit 220 may perform the following control in order to achieve appropriate airflow adjustment effects even when the crosswind is blowing. That is, the airflow adjustment control unit 220 may perform the control of: increasing intensity of the outward airflow Fout generated by the outward airflow generator 31 disposed on a windward side; and decreasing intensity of the outward airflow Fout generated by the outward airflow generator 31 disposed on a leeward side or stopping generation of the outward airflow Fout generated by the outward airflow generator 31 disposed on the leeward side.

The airflow adjustment control unit 220 may further perform control of varying the intensity of the outward airflow Fout generated by each of the outward airflow generators 31 disposed side by side on both the left and the right sides depending on a position of the outward airflow generator 31 of interest in the vehicle front-rear direction (i.e., a direction in which the ridge lines 21a extend or a direction in which the outward airflow generators 31 are disposed side by side). For example, in order to guide the traveling wind W flowing along the lateral-side end of the bonnet 21 toward the outer side in the vehicle widthwise direction precociously, the intensity of the outward airflow Fout generated by the outward airflow generator 31 disposed on the vehicle front side may be set higher than the intensity of the outward airflow Fout generated by the outward airflow generator 31 disposed on the vehicle rear side. Further, in order to prevent the outward airflow Fout from joining an airflow jetting from the wheel house 23 toward the outer side in the vehicle widthwise direction and to thereby prevent promoting growth of a turbulent flow in the vicinity of the lateral-side portion of the vehicle 1, the intensity of the outward airflow Fout that passes above the wheel arch 22a may be set lower than the intensity of the outward airflow Fout that passes other regions.

Example workings and example effects obtained by the airflow adjusting apparatus according to the first example embodiment are described below in comparison to that according to a comparative example.

With regard to the comparative example, components that are the same or correspond to the respective components described in the first example embodiment of the technology are denoted with reference signs same as those used in the first example embodiment, and description thereof will be omitted. In the description below, points in which the comparative example is different from the first example embodiment will be mainly described. The same applies to other example embodiments, which will be described later. The comparative example involves a vehicle corresponding to the vehicle 1 according to the first example embodiment with the airflow adjusting apparatus including the airflow generating apparatus 30 being removed.

Figure 5:
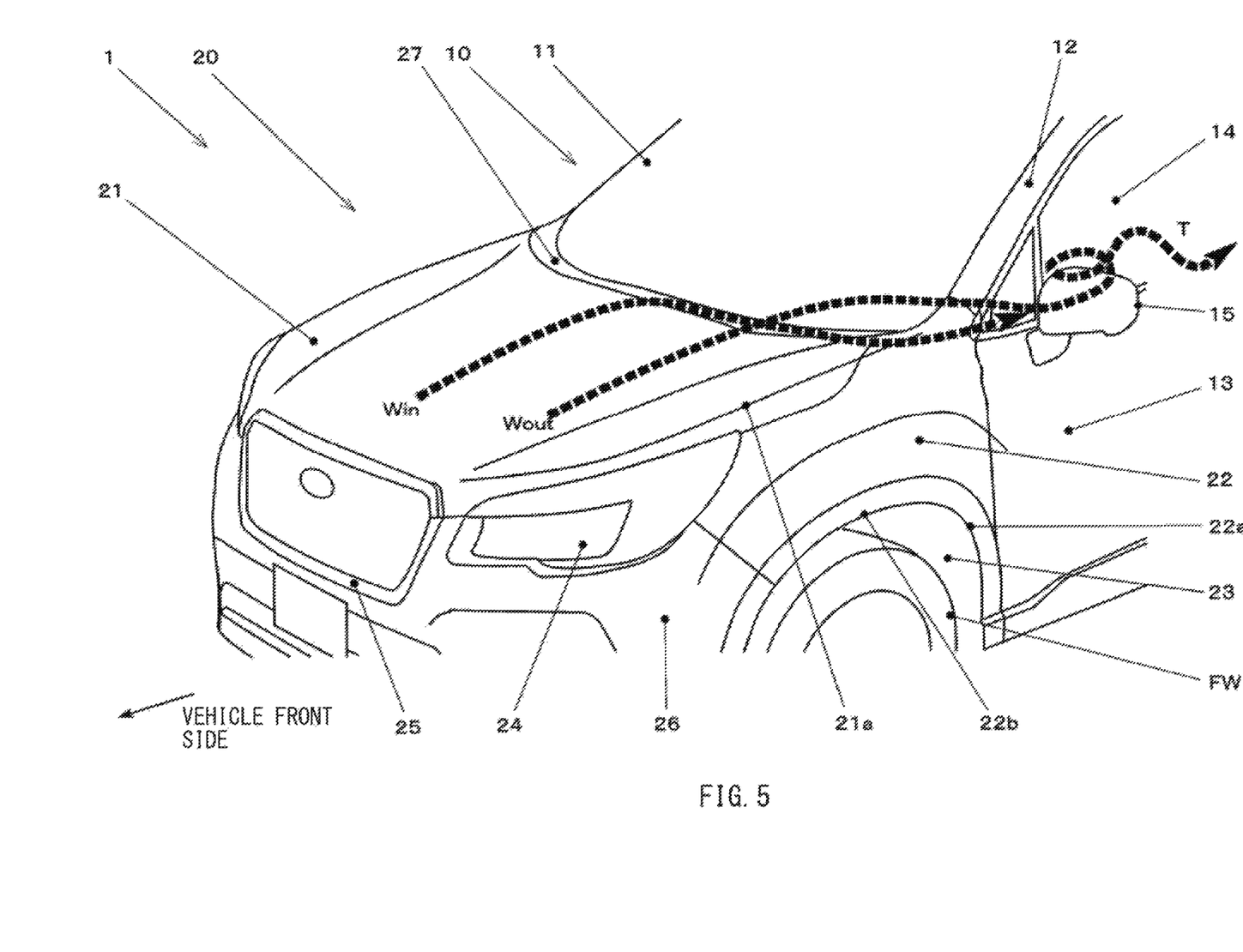
FIG. 5 is an external perspective view of a front portion of a vehicle according to a comparative example.

FIG. 5 is an external perspective view of a front portion of the vehicle according to the comparative example.

According to the comparative example, traveling wind Wout flowing along a lateral-side end of the bonnet 21 in the vicinity of the surface of the bonnet 21 interferes with a region in the vicinity of a lateral-side end of the windshield 11 and is deflected toward the outer side in the vehicle widthwise direction. The traveling wind Wout passes by the A-pillar 12, gets caught toward the front door glass 14, and generates a turbulent flow T accompanied by a vortex flow near a front portion of the front door glass 14. When intensity of the turbulent flow increases, air resistance against the vehicle can also increase, and aerodynamic noise (so-called wind noise), aerodynamic vibration, etc. can deteriorate.

Meanwhile, traveling wind Win flowing along a middle portion in the vehicle widthwise direction in the vicinity of the surface of the bonnet 21 interferes with a middle portion of the windshield 11 and partially gets caught in the cowl 27. Further, after getting caught in the cowl 27, the traveling wind Win flows in the cowl 27 toward the outer side in the vehicle widthwise direction, jets out toward the outer side in the vehicle widthwise direction at a lower portion of the A-pillar 12, and joins the traveling wind Wout that has passed by the A-pillar 12, thereby promoting growth of the turbulent flow T.

In contrast, according to the first example embodiment, formation of a turbulent flow in the vicinity of the lateral-side surface of the vehicle body around the A-pillar 12 is suppressed. In one specific but non-limiting example, formation of the turbulent flow in the vicinity of the lateral-side surface of the vehicle body on the rear side of the A-pillar 12 is suppressed.

In one specific but non-limiting example, as illustrated in FIG. 1, the two or more outward airflow generators 31 included in the airflow generating apparatus 30 may each form the outward airflow Fout that flows toward the outer side in the vehicle widthwise direction, thereby guiding the traveling wind W flowing along the lateral-side end of the bonnet 21 toward the outer side in the vehicle widthwise direction to avoid the windshield 11 and the A-pillar 12. This contributes to preventing the traveling wind W from interfering the windshield 11 to get caught on the rear side of the A-pillar 12, making it possible to suppress generation and growth of the turbulent flow.

As described above, the following effects are achievable according to the first example embodiment of the technology.

(1) The outward airflow generators 31 may generate the respective outward airflows Fout with respect to the vehicle body. The outward airflows F may each flow in a direction that is toward the outer side in the vehicle widthwise direction and toward the vehicle rear side. This allows the traveling wind W flowing along the lateral-side end of the bonnet 21 in the vicinity of the surface of the bonnet 21 to be guided toward the outer side in the vehicle widthwise direction. Accordingly, it is possible to prevent the traveling wind W from interfering with the windshield 11 and the A-pillar 12 to get caught on the rear side of the A-pillar 12, making it possible to suppress generation and growth of the turbulent flow T accompanied by a vortex flow.

(2) The plasma actuators 100 may be adopted as the respective outward airflow generators 31. This allows the outward airflows Fout to be generated with favorable responsiveness by means of a simple and robust configuration having no movable part. As a result, it is possible to stably achieve the above-described airflow adjustment effects.

(3) The intensity of the outward airflow Fout generated by each of the two or more outward airflow generators 31 may be varied depending on the position of the outward airflow generator 31 of interest in the vehicle front-rear direction. This makes it possible to optimize behavior of the airflow around the vehicle.

(4) The intensity of the outward airflow Fout may be controlled on the basis of the state of crosswind that acts on the vehicle. As a result, it is possible to achieve appropriate airflow adjustment effects even in a case where the crosswind is blowing.

Second Example Embodiment

Next, a second example embodiment of the technology is described.

Figure 6:
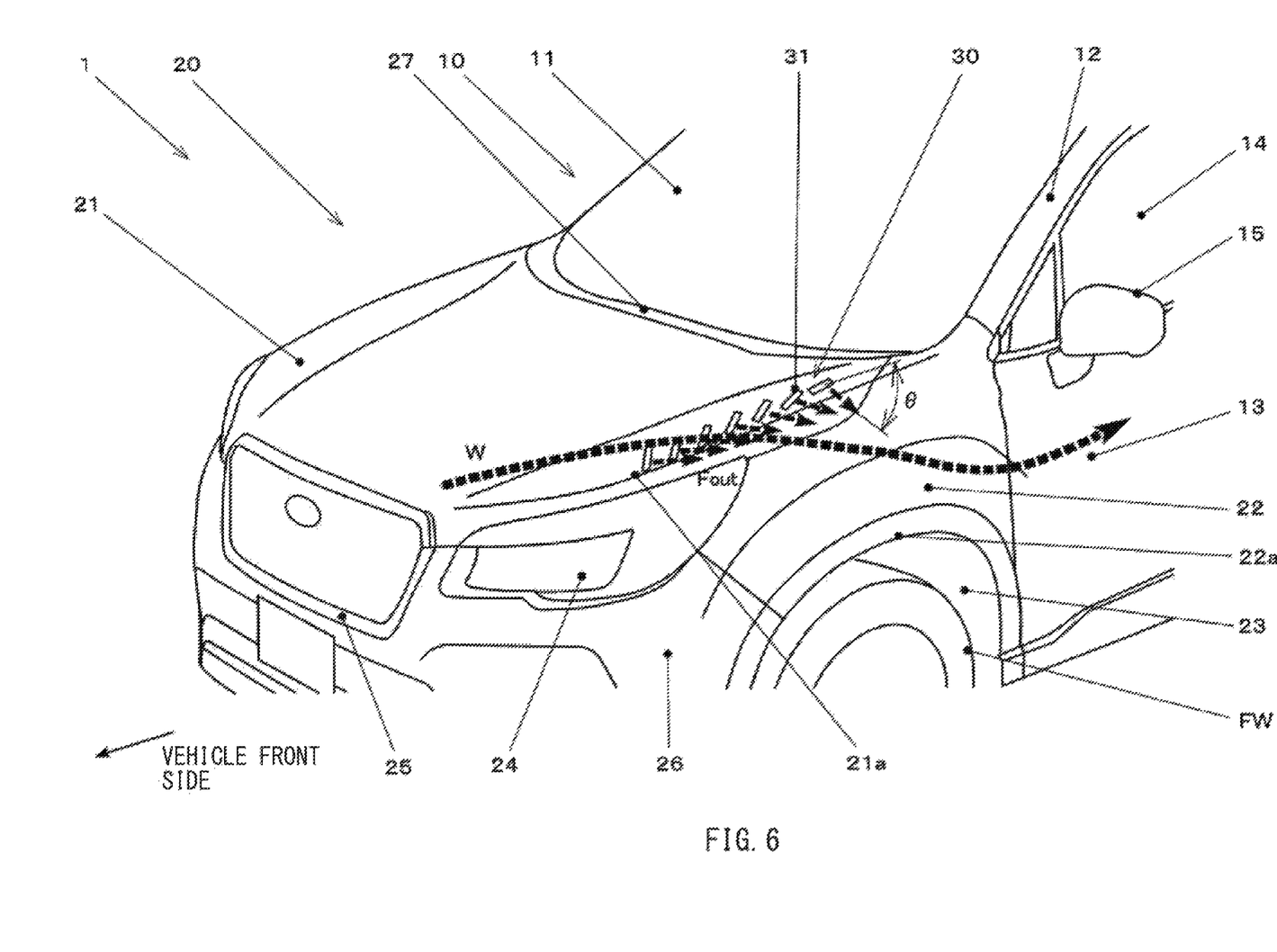
FIG. 6 is an external perspective view of an example of a front portion of a vehicle provided with an airflow adjusting apparatus according to one embodiment of the technology.

FIG. 6 is an external perspective view of a front portion of a vehicle provided with an airflow adjusting apparatus according to the second example embodiment of the technology.

The airflow generating apparatus 30 according to the second example embodiment may be so disposed that angles θ between the vehicle front-rear direction, e.g., the direction toward the vehicle rear side, and the respective flow directions of the outward airflows Fout generated by the outward airflow generators 31 are greater on the vehicle rear side than on the vehicle front side. According to the second example embodiment, installation angles of the outward airflow generators 31 on the vehicle front side may be set different from the installation angles of the outward airflow generators 31 on the vehicle rear side in a plan view of the vehicle 1, thereby setting the angles θ to be gradually greater from the vehicle front side toward the vehicle rear side.

The second example embodiment described above also makes it possible to achieve effects similar to those of the first example embodiment.

In addition, the outward airflows Fout may be generated at steeper angles on the rear side of the bonnet 21 that is close to the windshield 11. This allows the traveling wind W flowing near the windshield 11 to be strongly guided to the outer side in the vehicle widthwise direction, causing the traveling wind W to be blown to the lateral side of the vehicle 1. This makes it possible to suppress reattachment of the traveling wind W to the lateral-side surface of the vehicle body.

Third Embodiment

Next, a third example embodiment of the technology is described.

Figure 7:
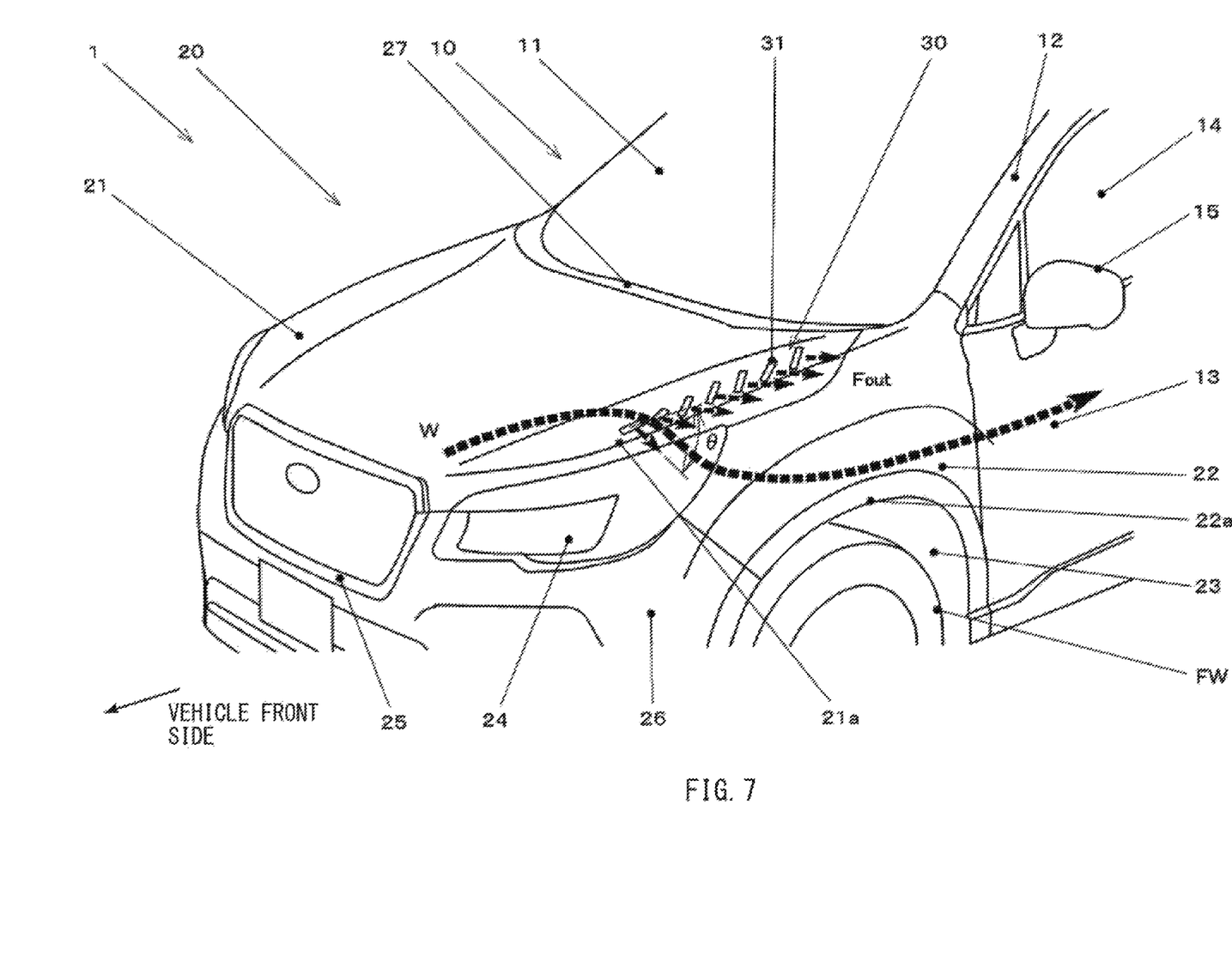
FIG. 7 is an external perspective view of an example of a front portion of a vehicle provided with an airflow adjusting apparatus according to one example embodiment of the technology.

FIG. 7 is an external perspective view of a front portion of a vehicle that includes an airflow adjusting apparatus according to the third example embodiment of the technology.

The airflow generating apparatus 30 according to the third example embodiment may be so disposed that angles θ between the vehicle front-rear direction and the respective flow directions of the outward airflows Fout generated by the outward airflow generators 31 are greater on the vehicle front side than on the vehicle rear side. Further, the installation angles of the outward airflow generators 31 may be so set to be different between the vehicle front side and the vehicle rear side in a plan view of the vehicle 1 that the angles θ are gradually smaller from the vehicle front side toward the vehicle rear side.

The third example embodiment described above also makes it possible to achieve effects similar to those of the first example embodiment.

In addition, the outward airflows Fout may be generated at steeper angles on the front side of the bonnet 21. This allows the traveling wind W to be guided strongly to the outer side in the vehicle widthwise direction precociously. As a result, it is possible to more certainly suppress interference between the windshield 11 and the A-pillars 12.

Fourth Example Embodiment

Next, a fourth example embodiment of the technology is described.

Figure 8:
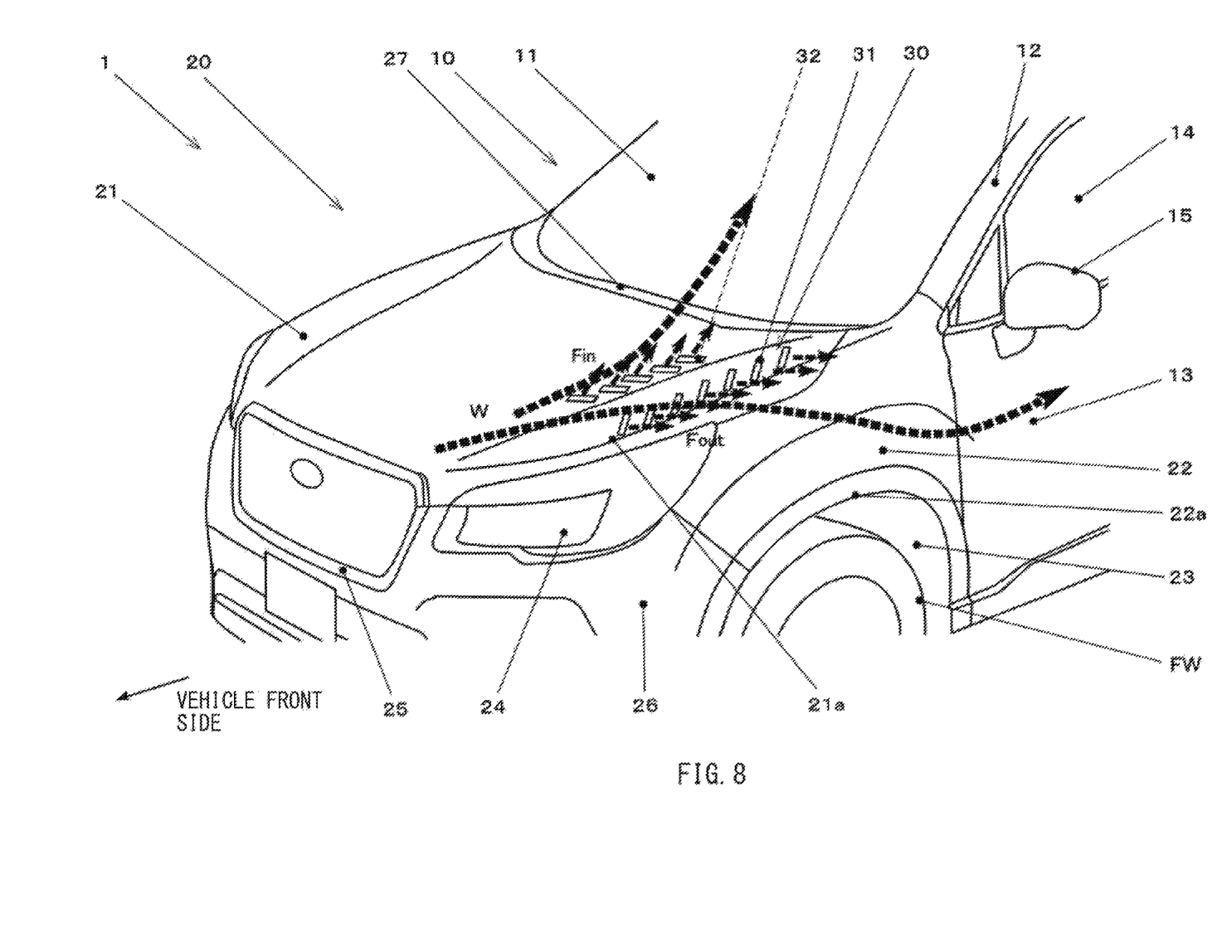
FIG. 8 is an external perspective view of an example of a front portion of a vehicle provided with an airflow adjusting apparatus according to one example embodiment of the technology.

FIG. 8 is an external perspective view of a front portion of a vehicle provided with an airflow adjusting apparatus according to the fourth example embodiment of the technology.

The airflow generating apparatus 30 according to the fourth example embodiment may have a configuration similar to that in the first example embodiment, and may further include two or more inward airflow generators 32, which are described below, in addition to the disposed outward airflow generators 31.

The inward airflow generators 32 may be arranged in a single row in the vehicle front-rear direction on the upper surface of the vehicle body on the front side of the windshield 11, i.e., in a region provided on the surface of the bonnet 21 on the inner side of the outward airflow generators 31 in the vehicle widthwise direction. FIG. 8 illustrates only the inward airflow generators 32 arranged on one side (on the left side when viewed toward the traveling direction in the example illustrated in FIG. 8); however, the inward airflow generators 32 may be disposed symmetrically on the both sides in the vehicle widthwise direction with respect to the center of the vehicle body in the vehicle widthwise direction.

According to the fourth example embodiment, the two-electrode plasma actuators may be adopted as the respective inward airflow generators 32. The two-electrode plasma actuators may each have a configuration similar to that adopted as the outward airflow generator 31. However, flow directions of airflows induced by plasma are different between the inward airflow generators 32 and the outward airflow generators 31. The inward airflow generators 32 may each generate an inward airflow Fin with respect to the vehicle body in a direction that is toward the inner side in the vehicle widthwise direction and toward the vehicle rear side. The inward airflow Fin may so flow as to tilt in the vehicle front-rear direction. In one embodiment, the inward airflow generator 32 may server as an "inward airflow generator".

The fourth example embodiment described above also makes it possible to achieve effects similar to those of the first example embodiment.

In addition, according to the fourth example embodiment, the traveling wind W flowing in a region closer to the middle than the lateral-side end in the vehicle widthwise direction may be deflected toward the inner side in the vehicle widthwise direction, causing the traveling wind W to flow above the windshield 11 toward the rear side (the upper side). As a result, it is possible to suppress generation and growth of a turbulent flow in the vicinity of the lateral-side surface of the vehicle body. Note that it is comparatively difficult to guide the traveling wind W flowing in a region closer to the middle than the lateral-side end in the vehicle widthwise direction to the outer side in the vehicle widthwise direction.

Moreover, adopting the plasma actuators 100 as the respective inward airflow generators 32 allows the inward airflows Fin with favorable responsiveness to be generated by means of a simple and robust configuration having no movable part. As a result, it is possible to stably achieve the above-described airflow adjustment effects.

Fifth Example Embodiment

Next, a fifth example embodiment of the technology is described.

Figure 9:
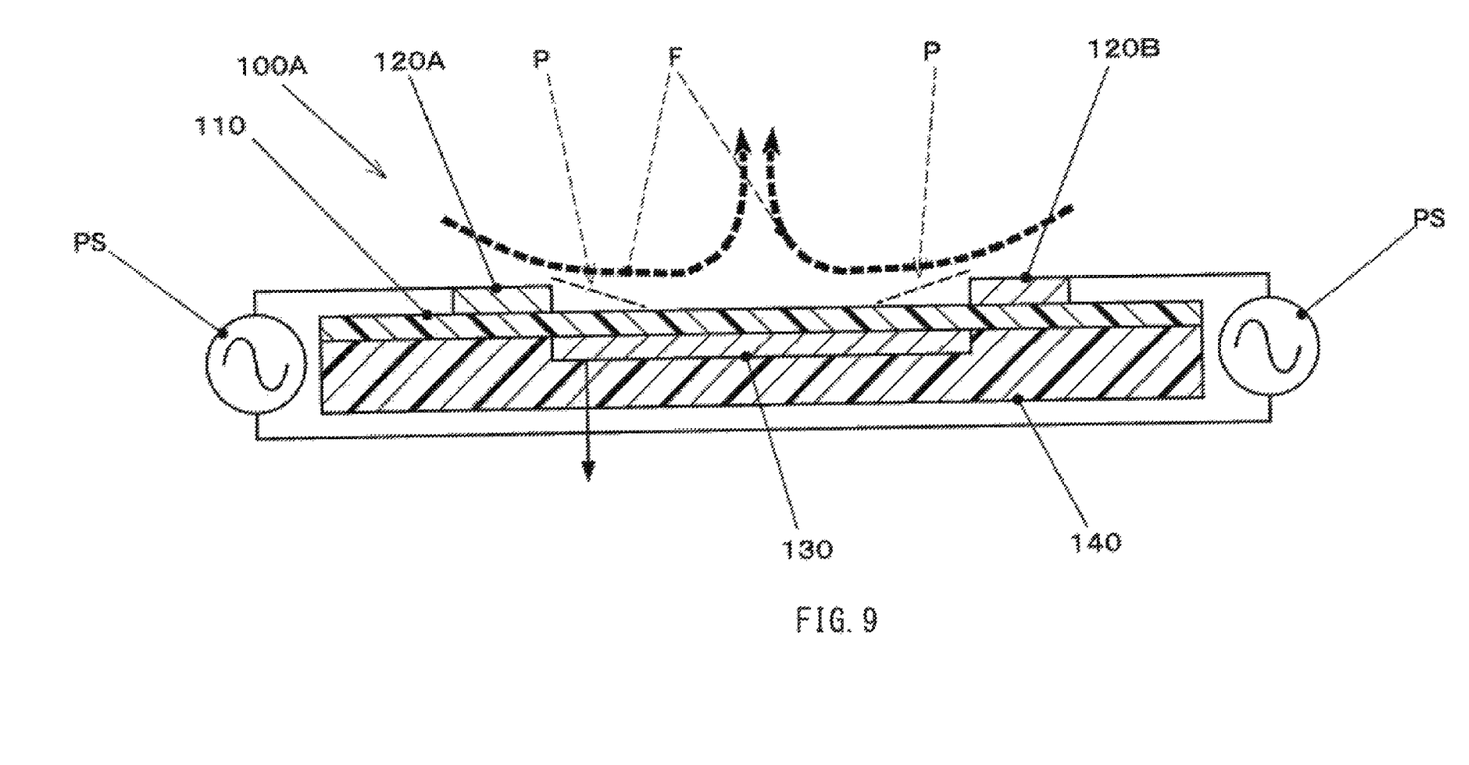
FIG. 9 is a schematic cross-sectional view of an example of a three-electrode plasma actuator to be included in an airflow adjusting apparatus according to one example embodiment of the technology.

According to the fifth example embodiment of the technology, three-electrode plasma actuators 100A, which are described below, may be adopted as the respective outward airflow generators 31 and the respective inward airflow generators 32 of the airflow generating apparatus 30, instead of the two-electrode plasma actuators 100 adopted in the first to the fourth example embodiments.

FIG. 9 is a schematic cross-sectional view of the three-electrode plasma actuator 100A to be included in an airflow adjusting apparatus according to the fifth embodiment of the technology.

The three-electrode plasma actuator 100A may include a pair of upper electrodes 120 (i.e., upper electrodes 120A and 120B) on one side of the dielectric 110 in a thickness direction, and include the lower electrode 130 on the other side of the dielectric 110. The pair of upper electrodes 120 (120A and 120B) may be disposed on both sides of the lower electrode 130 in a planar direction, and may be disposed symmetrically about the lower electrode 130. The power supplies PS may be independently provided for the respective upper electrodes 120A and 120B. In one embodiment, the dielectric 110 may serve as the "dielectric". In one embodiment, the upper electrodes 120 and the lower electrode 130 may serve as the "electrodes". In one embodiment, the power supplies PS may each serve as the "power supply".

The three-electrode plasma actuator 100A may use the power supplies PS to apply predetermined alternating-current voltages to the respective upper electrodes 120A and 102B, thereby allowing plasma P to be generated between the upper electrode 120A and the lower electrode 130 and also between the upper electrode 120B and the lower electrode 130. Further, the plasma P may allow airflows F that are opposed to each other to be induced. The opposing airflows F may crash to join each other, and the joined airflows F may be deflected, thereby allowing an airflow to be generated that flows in a direction away from a principal plane of the plasma actuator 100A, typically, in a direction of a normal to the principal surface.

The three-electrode plasma actuator 100A may be operated not only by applying voltages to both the upper electrodes 120A and 120B, but also by applying a voltage to only one of the upper electrodes 120 (i.e., the upper electrode 120A or 120B). This allows an airflow to be generated that flows along the principal surface, as with the two-electrode plasma actuator 100 described above.

In addition, the flow direction of the joined airflows may be controlled by controlling a factor such as the voltages to be applied to the upper electrodes 120A and 120B.

According to the fifth example embodiment described above, a velocity vector having a component in a direction away from the surface of the bonnet 21 may be given to the outward airflow Fout, the inward airflow Fin, or both. This allows an airflow (the traveling wind W) flowing in the vicinity of the surface of the bonnet 21 to be blown upward from the surface of the bonnet 21. This makes it possible to optimize the flow direction of the outward airflow Fout, the inward airflow Fin, or both and guide the traveling wind W more appropriately, thereby promoting the airflow adjustment effects.

In a case of a vehicle including a bonnet on a front side of a vehicle compartment, traveling wind passes the vicinity of a surface of the bonnet from a vehicle front side toward a vehicle rear side relative to a vehicle body while the vehicle is traveling. Such traveling wind flows toward an A-pillar (or a front pillar) that supports a lateral-side end of a windshield via a cowl or due to interference with the windshield. Further, the traveling wind gets caught on the rear side of the A-pillar, thereby generating and promoting a turbulent flow in the vicinity of the lateral-side surface of the vehicle body. When intensity of the turbulent flow increases, air resistance against the vehicle can increase, and in addition, aerodynamic noise (so-called wind noise) and aerodynamic vibration can deteriorate. To address this, according to the example embodiments of the technology, it is possible to suppress formation of the turbulent flow in the vicinity of the lateral-side surfaces of the vehicle body around the A-pillars 12, e.g., behind the A-pillars 12. This makes it possible to suppress an increase in the air resistance caused when the traveling wind passes, and makes it possible to suppress deterioration of the aerodynamic noise and aerodynamic vibration.

According to any of the example embodiments of the technology, it is possible to provide an airflow adjusting apparatus that suppresses formation of a turbulent flow around a front pillar.

Modifications

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

(1) The configurations of the airflow adjusting apparatus and the vehicle are not limited to those described in the example embodiments above, and may be appropriately changed.

For example, a shape of the vehicle and an installation position of the airflow adjusting apparatus may be appropriately changed.

(2) In the example embodiments described above, the outward airflow generators may be arranged in a single row in the vehicle front-rear direction and the inward airflow generators may be arranged in a single row in the vehicle front-rear direction in the airflow adjusting apparatus. However, the outward airflow generators may be arranged in multiple rows such as two or more rows, for example. Similarly, the inward airflow generators may be arranged in multiple rows such as two or more rows, for example.

(3) According to the first example embodiment, etc., the airflow-state estimator may control the intensity of the airflow on the basis of the state of the crosswind. However, in one example embodiment, the intensity of the airflow may be controlled on the basis of a change in a state of anything other than the crosswind. For example, the intensity of airflow may be controlled on the basis of a formation state of a turbulent flow (e.g., intensity of a vortex) around the vehicle, a traveling speed of the vehicle, or any other factor.

(4) According to the first example embodiment, etc., the pressure sensor provided on the lateral-side portion of the vehicle body may detect the crosswind. However, in one example embodiment, another method may be used to detect the crosswind. For example, an output from an acceleration sensor that detects lateral acceleration acting on the vehicle body may be used to estimate the crosswind from behavior of the vehicle body caused by the crosswind.

Each of the power supply unit 210 (e.g., a driving circuit in the power supply unit 210) and the airflow adjustment control unit 220 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the power supply unit 210 (e.g., the driving circuit in the power supply unit 210) and the airflow adjustment control unit 220 illustrated in FIG. 4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the power supply unit 210 (e.g., the driving circuit in the power supply unit 210) and the airflow adjustment control unit 220 illustrated in FIG. 4.

The invention claimed is:

1. An airflow adjusting apparatus to be installed in a vehicle, the apparatus comprising:
    two or more outward airflow generators that are disposed side by side in a vehicle front-rear direction in vicinity of a ridge line defining an outer edge in a vehicle widthwise direction on an upper surface of a vehicle body on a front side of a windshield, the outward airflow generators each being configured to form an outward airflow with respect to the vehicle body, the outward airflow flowing in a direction that is toward an outer side in the vehicle widthwise direction and toward a rear side of the vehicle; and
    a controller configured to control the outward airflow generators.

2. The airflow adjusting apparatus according to claim 1, wherein the outward airflow generators each comprise a plasma actuator, the plasma actuator including a power supply and at least a pair of electrodes, the pair of electrodes being disposed with a dielectric interposed in between, the power supply being configured to apply an alternating-current voltage to the pair of electrodes.

3. The airflow adjusting apparatus according to claim 1, wherein the outward airflow generators are disposed to cause angles between respective flow directions of the outward airflows and a direction toward the rear side of the vehicle to be greater on the rear side of the vehicle than on a front side of the vehicle.

4. The airflow adjusting apparatus according to claim 2, wherein the outward airflow generators are disposed to cause angles between respective flow directions of the outward airflows and a direction toward the rear side of the vehicle to be greater on the rear side of the vehicle than on a front side of the vehicle.

5. The airflow adjusting apparatus according to claim 1, wherein the outward airflow generators are disposed to cause angles between respective flow directions of the outward airflows and a direction toward the rear side of the vehicle to be greater on a front side of the vehicle than on the rear side of the vehicle.

6. The airflow adjusting apparatus according to claim 2, wherein the outward airflow generators are disposed to cause angles between respective flow directions of the outward airflows and a direction toward the rear side of the vehicle to be greater on a front side of the vehicle than on the rear side of the vehicle.

7. The airflow adjusting apparatus according to claim 1, wherein the outward airflow generators differ from each other in intensity of the outward airflow depending on positions of the outward airflow generators in the vehicle front-rear direction.

8. The airflow adjusting apparatus according to claim 2, wherein the outward airflow generators differ from each other in intensity of the outward airflow depending on positions of the outward airflow generators in the vehicle front-rear direction.

9. The airflow adjusting apparatus according to claim 1, further comprising
    an airflow-state detector configured to detect a state of an airflow around the vehicle body, wherein
        the controller is further configured to control, on a basis of the state of the airflow detected by the airflow-state detector, intensity of the outward airflow formed by each of the outward airflow generators.

10. The airflow adjusting apparatus according to claim 2, further comprising
    an airflow-state detector configured to detect a state of an airflow around the vehicle body, wherein
        the controller is further configured to control, on a basis of the state of the airflow detected by the airflow-state detector, intensity of the outward airflow formed by each of the outward airflow generators.

11. The airflow adjusting apparatus according to claim 1, further comprising
    two or more inward airflow generators that are disposed side by side in the vehicle front-rear direction on the upper surface of the vehicle body on the front side of the windshield, the inward airflow generators being disposed on an inner side in the vehicle widthwise direction compared to the outward airflow generators, the inward airflow generators each being configured to form an inward airflow with respect to the vehicle body, the inward airflow flowing in a direction that is toward the inner side in the vehicle widthwise direction and toward the rear side of the vehicle, wherein
the controller is further configured to control the inward airflow generators.

12. The airflow adjusting apparatus according to claim 2, further comprising
two or more inward airflow generators that are disposed side by side in the vehicle front-rear direction on the upper surface of the vehicle body on the front side of the windshield, the inward airflow generators being disposed on an inner side in the vehicle widthwise direction compared to the outward airflow generators, the inward airflow generators each being configured to form an inward airflow with respect to the vehicle body, the inward airflow flowing in a direction that is toward the inner side in the vehicle widthwise direction and toward the rear side of the vehicle, wherein
the controller is further configured to control the inward airflow generators.

13. An airflow adjusting apparatus to be installed in a vehicle, the apparatus comprising:
two or more inward airflow generators that are disposed side by side in a vehicle front-rear direction in vicinity of a ridge line defining an upper surface of a vehicle body on a front side of a windshield, the inward airflow generators each being configured to form an inward airflow with respect to the vehicle body, the inward airflow flowing in a direction that is toward an inner side in a vehicle widthwise direction of the vehicle and toward a rear side of the vehicle; and
a controller configured to control the inward airflow generators.

14. The airflow adjusting apparatus according to claim 13, wherein the inward airflow generators are disposed on both sides, in the vehicle widthwise direction, of a center of the vehicle body in the vehicle widthwise direction.

15. The airflow adjusting apparatus according to claim 13, wherein the inward airflow generators each comprise a plasma actuator, the plasma actuator including a power supply and at least a pair of electrodes, the pair of electrodes being disposed with a dielectric interposed in between, the power supply being configured to apply an alternating-current voltage to the pair of electrodes.

16. The airflow adjusting apparatus according to claim 13, wherein the inward airflow generators each comprise a plasma actuator, the plasma actuator including a power supply and at least a pair of electrodes, the pair of electrodes being disposed with a dielectric interposed in between, the power supply being configured to apply an alternating-current voltage to the pair of electrodes.

17. The airflow adjusting apparatus according to claim 2, further comprising two or more inward airflow generators that are disposed side by side in the vehicle front-rear direction in vicinity of the ridge line, the two or more inward airflow generators each being configured to form an inward airflow with respect to the vehicle body, the inward airflow flowing in a direction that is toward an inner side in the vehicle widthwise direction of the vehicle and toward the rear side of the vehicle,
wherein the two or more inward airflow generators each comprise a plasma actuator, the plasma actuator including a power supply and at least a pair of electrodes, the pair of electrodes being disposed with a dielectric interposed in between, the power supply being configured to apply an alternating-current voltage to the pair of electrodes.

\* \* \* \* \*